United States Patent
Woodcock et al.

(10) Patent No.: US 8,745,255 B2
(45) Date of Patent: Jun. 3, 2014

(54) CONFIGURATION AND DISTRIBUTION OF CONTENT AT CAPTURE

(75) Inventors: Katrika Woodcock, Issaquah, WA (US); Karon A. Weber, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 128 days.

(21) Appl. No.: 12/391,824

(22) Filed: Feb. 24, 2009

(65) Prior Publication Data
US 2010/0217834 A1     Aug. 26, 2010

(51) Int. Cl.
*G06F 15/16*     (2006.01)

(52) U.S. Cl.
USPC ............ 709/231; 709/206; 709/207; 705/319

(58) Field of Classification Search
CPC . G06Q 10/101; G06Q 50/01; H04N 1/00127; H04N 1/00204; H04N 1/00251; H04N 1/00307; H04N 1/0402; H04N 1/0417; H04N 1/3871; G06T 5/00; H04L 67/02; H04L 49/201; H04L 51/06; H04L 51/066; H04L 51/10; H04L 51/32; H04L 51/38
USPC .......... 345/156, 173, 204; 382/115, 176, 232, 382/254, 274; 455/426.1, 440; 705/26; 709/206, 207, 219, 231; 348/211.6, 348/211.9
See application file for complete search history.

(56) References Cited

U.S. PATENT DOCUMENTS

| 6,072,475 | A * | 6/2000 | van Ketwich ................. 345/173 |
|---|---|---|---|
| 6,430,604 | B1 * | 8/2002 | Ogle et al. .................... 709/207 |
| 6,642,959 | B1 | 11/2003 | Arai |
| 7,256,823 | B2 | 8/2007 | Ward et al. |
| 7,346,342 | B2 | 3/2008 | Kirbas |
| 7,362,462 | B2 | 4/2008 | Sadovsky et al. |
| 2002/0003535 | A1* | 1/2002 | Cho .............................. 345/204 |
| 2005/0001904 | A1* | 1/2005 | Kiiskinen ................. 348/207.1 |
| 2005/0055281 | A1* | 3/2005 | Williams ........................ 705/26 |
| 2005/0102376 | A1* | 5/2005 | Ichikawa ..................... 709/219 |

(Continued)

FOREIGN PATENT DOCUMENTS

| JP | 2003-209824 A | 7/2003 |
|---|---|---|
| JP | 2004-078837 A | 3/2004 |

(Continued)

OTHER PUBLICATIONS

"The Nokia N82", Retrieved at<<http://www.then82blog.com/2008/06/shozu-upload-photos-video-to-picasa.html>>, Jun. 9, 2008, pp. 1-6.

(Continued)

*Primary Examiner* — Melvin H Pollack
(74) *Attorney, Agent, or Firm* — Sung Kim; Andrew Sanders; Micky Minhas (57) ABSTRACT

Configuring a computing device to capture content, and distributing the content to one or more content destinations at a point of capture. The user select the content destinations from a list of destinations, or the content destinations are selected automatically based on previous user activities or selections. Configuration data sets corresponding to the selected content destinations are accessed. Content capture settings from the configuration data sets are applied to the computing device. The computing device captures the content in accordance with the applied content capture settings. Without further user input, the captured content is transmitted to each of the selected content destinations.

20 Claims, 6 Drawing Sheets

(56) References Cited

U.S. PATENT DOCUMENTS

| | | | |
|---|---|---|---|
| 2006/0003761 A1* | 1/2006 | Fry et al. | 455/426.1 |
| 2006/0031126 A1 | 2/2006 | Ma et al. | |
| 2006/0123086 A1* | 6/2006 | Morris | 709/206 |
| 2007/0146798 A1* | 6/2007 | Eto et al. | 358/302 |
| 2007/0186002 A1 | 8/2007 | Campbell et al. | |
| 2008/0095527 A1 | 4/2008 | Lee et al. | |
| 2008/0215711 A1* | 9/2008 | Shitrit | 709/220 |
| 2008/0249851 A1 | 10/2008 | Angell et al. | |
| 2009/0012806 A1 | 1/2009 | Ricordi et al. | |
| 2009/0271486 A1* | 10/2009 | Ligh et al. | 709/206 |
| 2010/0100371 A1* | 4/2010 | Yuezhong et al. | 704/9 |
| 2010/0104187 A1* | 4/2010 | Broadbent | 382/176 |
| 2010/0153465 A1* | 6/2010 | Dasgupta | 707/802 |

FOREIGN PATENT DOCUMENTS

| | | |
|---|---|---|
| JP | 2006-311493 A | 11/2006 |
| KR | 1020020012977 A | 2/2002 |
| KR | 1020040054445 A | 6/2004 |

OTHER PUBLICATIONS

"Advertiser Features", Retrieved at<<http://www.linearpublishing.com/Elist-9567.112112-9604.112112-p1106.111115_Webcams.html>>,Nov. 3, 2008, p. 1.

Lev-Ram Michal "New WiFi Camera Technology a Boon for Photo-Sharing Sites", Retrieved at<<http://techland. blogs.fortune.cnn.com/2007/10/30/new-wifi-camera-technology-a-boon-for-photo-sharing-sites/>>, Oct. 30, 2007, pp. 1-2.

Davis et al,"MMM2: Mobile Media Metadata for Media Sharing", Retrieved at<<http://fusion.sims.berkeley.edu/GarageCinema/pubs/pdf/pdf_49DE284E-CF77-4385-934F1AC56079D0AD.pdf>>, p. 4, Apr. 2005.

"International Search Report", Mailed Date: Jul. 30, 2010, Application No. PCT/US2010/021314, Filed Date: Jan. 18, 2010, pp. 9.

"China Notice of First Office Action", Mailed Date: Jun. 27, 2012, Application No. 201080009772.1, Filed Date: Jan. 18, 2010, pp. 10.

"China Notice of Second Office Action", Application No. 201080009772.1, Mailed Date: Aug. 15, 2012, pp. 6.

"Office Action", Japanese Patent Office, Application No. 2011-551080, Dated: Nov. 12, 2013, pp. 13.

* cited by examiner

CONFIGURATION AND DISTRIBUTION OF CONTENT AT CAPTURE

BACKGROUND

Many existing electronic devices allow content such as images and video to be captured. When a user captures an image with an existing device such as a camera or mobile telephone, the image is stored on the device only (e.g., on flash memory). Users later download the stored images from the camera onto another electronic device such as a laptop or desktop computer. From there, the user may individually disseminate one or more of the images to other destinations or upload the images to a web site for sharing. Some existing electronic devices such as mobile telephones allow the user to send the captured images over a mobile network to a destination such as a mobile telephone of another user. Saving or sending the stored images to other destinations, however, is a manual and time consuming process performed by only a minority of users.

Additionally, different destinations often require the content to be in different formats. For example, one destination may accept large images, while another destination only accepts of a limited size. Submitting the images to both of the destinations in this example requires the user to spend extra time converting the image into the different formats.

SUMMARY

Embodiments of the invention enable device configuration and distribution of content at a time of capture by the device. A plurality of configuration data sets are each associated with one or more of a plurality of content destinations. The configuration data sets include one or more content capture setting values. A selection of a plurality of the content destinations is received from a user of a computing device. The stored configuration data sets corresponding to the selected content destinations are identified. Prior to capture of content by the computing device, one or more of the content capture setting values from the identified configuration data sets are applied to the computing device. The computing device captures content in accordance with the applied content capture setting values. The captured content is transmitted from the computing device to each of the selected content destinations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable, at least, users such as user 110 to choose multiple destinations or uses for content 112 at or before the time of capturing the content 112 and automatically send the captured content 112 to the chosen destinations when the content 112 is captured without any additional involvement from the user 110. For example, when looking through a viewfinder of a mobile computing device 502 or other computing device 102, the user 110 is offered an onscreen display of destinations where the content 112 could be sent or used for, such as a search engine, a social networking site, or an electronic mail account. The captured content 112 is automatically sent to those destinations or applications in the appropriate size and format for the destination, in real time, upon the action of capturing the content 112. The captured content 112 is sent at one time, greatly reducing the amount of effort from the user 110 to share the captured content 112. In some embodiments, the captured content 112 includes audio data, video data, and/or still image data.

While aspects of the invention are described with reference to the computing device 102 being a mobile computing device 502 such as a mobile telephone, embodiments of the invention are operable with any computing device that captures content 112. For example, aspects of the invention are operable with devices such as digital cameras, digital video cameras, laptop computers, gaming consoles (including handheld gaming consoles), portable music players, a personal digital assistant, an information appliance, and a personal communicator. In some embodiments, the computing device 102 is a camera equipped with a wireless connection. Further, while embodiments of the disclosure include the computing device 102 connected to a network or cloud service, other embodiments include the computing device 102 not connected to the network. In such embodiments, the captured content 112 is stored on the computing device 102, and may be delivered when a network connection becomes available.

Referring again to FIG. 1, an exemplary block diagram illustrates the computing device 102 capturing content 112 and distributing the captured content 112 to a plurality of content destinations 114. The computing device 102 includes a memory area 106 and a processor 104. The memory area 106, or other computer-readable media, stores a plurality of configuration data sets 108 such as configuration data set #1 through configuration data set #N. Each of the configuration data sets 108 is associated with one or more of a plurality of the content destinations 114, such as content destination #1 through content destination #N.

In general, the memory area 106 is associated with the computing device 102. For example, in FIG. 1, the memory area 106 is within the computing device 102. However, the memory area 106 or any of the data stored thereon may be associated with any server or other computer, local or remote from the computing device 102 (e.g., accessible via a network).

Figure 1:
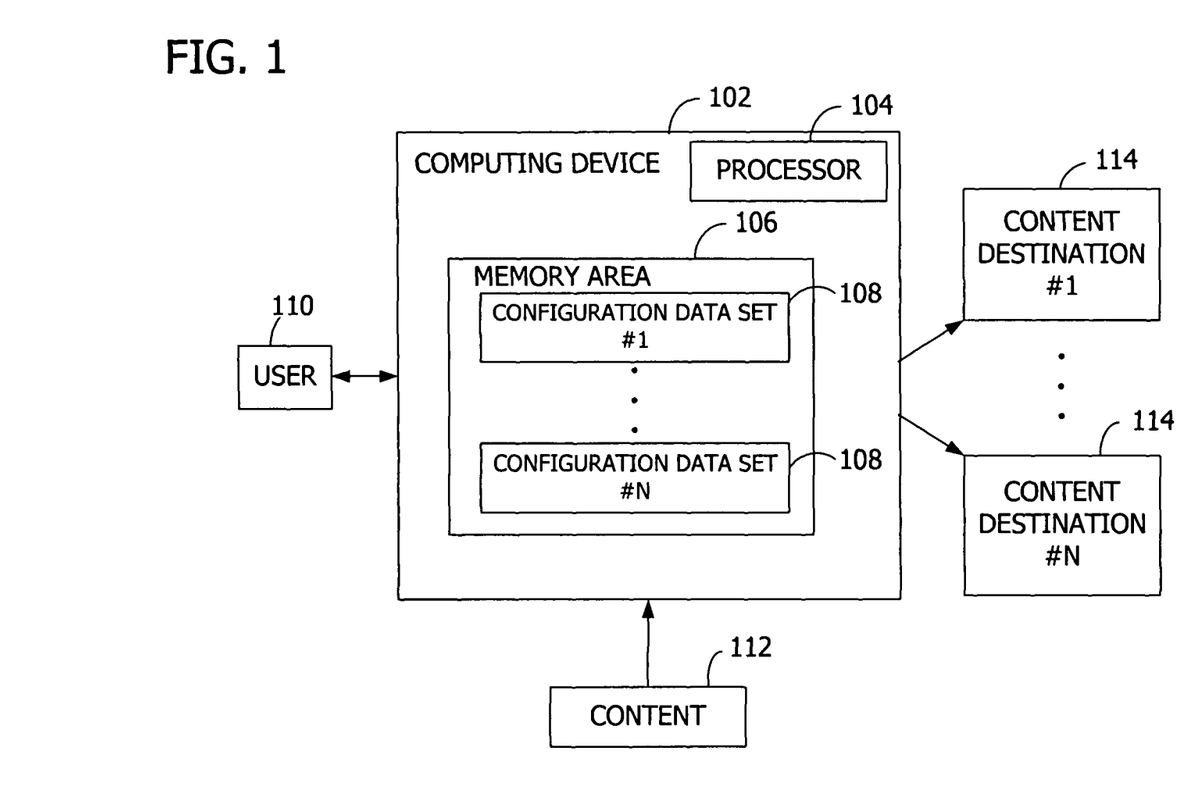
FIG. 1 is an exemplary block diagram illustrating a computing device capturing content and distributing the captured content to a plurality of content destinations.

The processor 104 is programmed to execute computer-executable instructions for implementing aspects of the disclosure. As an example, the processor 104 is programmed to provide, for display on the computing device 102, a list of the plurality of content destinations 114. The computing device 102 receives, from the user 110 of the computing device 102, a selection of a plurality of the content destinations 114 from the provided list. The processor 104 is programmed to access, from the memory area 106, the configuration data sets 108 corresponding to the selected content destinations 114. Content capture settings on the computing device 102 are adjusted based on the accessed configuration data sets 108. The computing device 102 captures the content 112 in accordance with the adjusted content capture settings.

The processor 104 is further programmed to process the captured content 112 in accordance with each of the accessed configuration data sets 108 to produce processed content for each of the selected content destinations 114. The computing device 102 then transmits the processed content from the computing device 102 to each of the selected content destinations 114.

In some embodiments, the content destinations 114 include uses, actions, formats, or settings. For example, the user 110 selects three different formats the selected content destinations 114: black-and-white, fisheye, and wide-angle. The three formats in this example may be going to a single location (e.g., a web-based photo gallery), to a plurality of locations, or just to a storage area on the computing device 102. The user 110 may alternatively or in addition select various sizes for the content 112: email-ready, print-ready, and wallpaper. In general, aspects of the disclosure enable the user 110 to define, pre-capture, any attribute that may be associated with the content 112.

Figure 3:
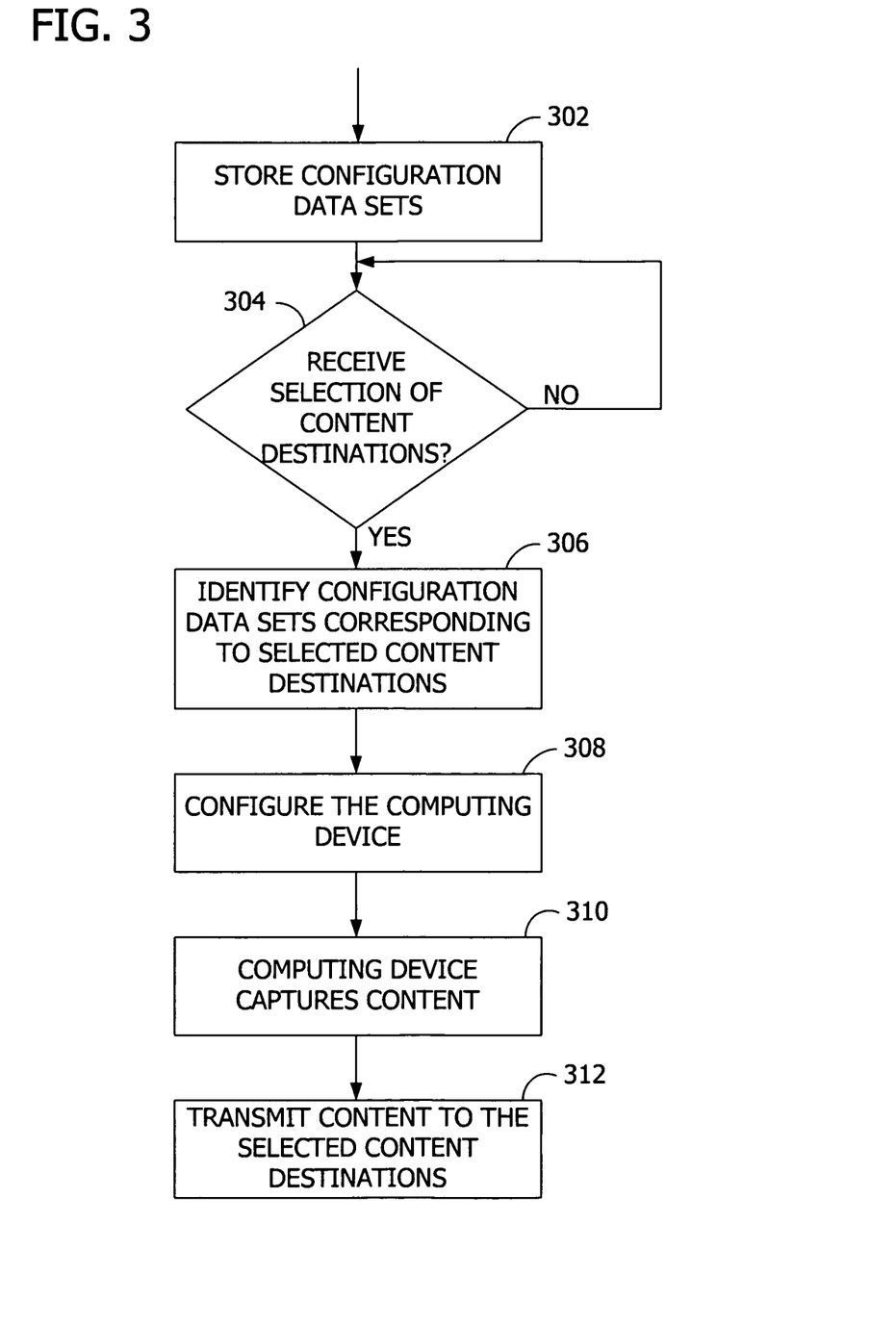
FIG. 3 is an exemplary flow chart illustrating the configuration of the computing device and distribution of content to selected content destinations.

In some embodiments, the processor 104 is programmed to execute instructions such as those illustrated in the figures (e.g., FIG. 3).

Figure 2:
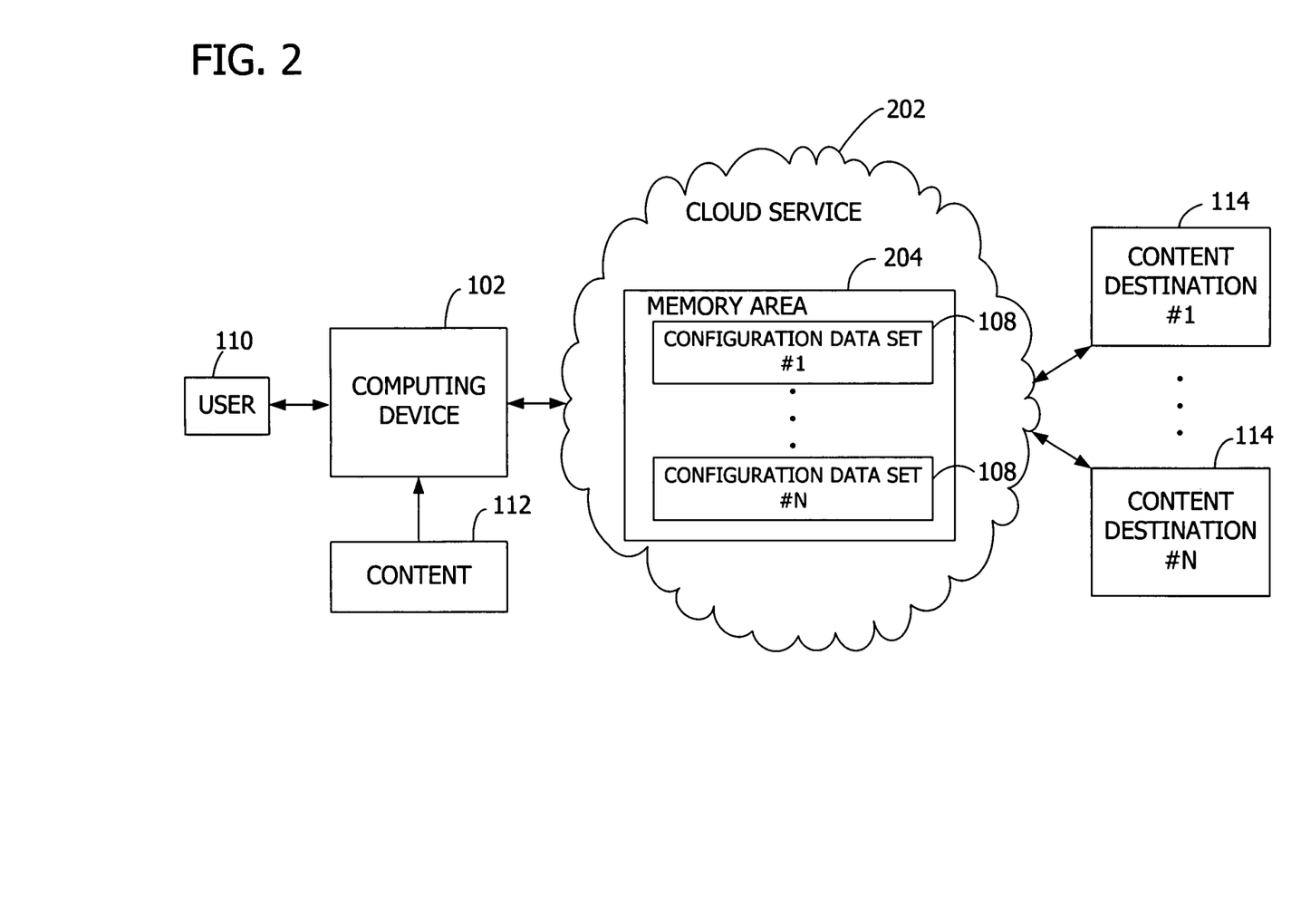
FIG. 2 is an exemplary block diagram illustrating a computing device interfacing with a cloud service to distribute the content to the content destinations.

Referring next to FIG. 2, an exemplary block diagram illustrates the computing device 102 interfacing with a cloud service 202 to distribute the content 112 to the content destinations 114. In the example of FIG. 2, the computing device 102 communicates with servers or other computing devices in the cloud service 202. The cloud service 202 stores the configuration data sets 108 in a memory area 204. The memory area 204 may be associated with one or more of the computing devices in the cloud service 202. In this example, the configuration data sets 108 are not stored by the computing device 102, but instead are accessible to the computing device 102 via a network such as, for example, the Internet.

Referring next to FIG. 3, an exemplary flow chart illustrates the configuration of the computing device 102 and distribution of content 112 to selected content destinations 114. At 302, the configuration data sets 108 are stored, for example, in the memory area 106. Each of the configuration data sets 108 has one or more content capture settings or values therein. Example content destinations 114 include an on-device gallery, a web-based image service, an electronic mail account, a map, and/or an image printer. In some embodiments, the available content destinations 114 are determined automatically based on services or applications located on the computing device 102 or for which the user 110 has signed up. The content destinations 114 may also be determined or added by the user 110. The list of content destinations 114 for display to the user 110 may be shortened to an appropriate onscreen length with additional options available in pivots or other menu screens.

In some embodiments, a list of one or more of the available content destinations 114 is provided for display on the computing device 102. The user 110 interacts with the displayed list to select one or more of the content destinations 114. The content destinations 114 may be selected by, for example, one or more of the following user actions: touching a screen of the computing device 102 (e.g., via a finger or stylus), tilting the computing device 102 in one or more directions (e.g., for computing devices 102 equipped with at least one accelerometer), gesturing on a screen of the mobile computing device 502 (e.g., the user 110 making one or more gestures with one or more fingers on a touch screen of the mobile computing device 502), and flicking the mobile computing device 502 (e.g., sharply moving the mobile computing device 502 according to one or more predefined motions recognizable by the mobile computing device 502).

If the selection of content destinations 114 is received from the user 110 at 304, the method identifies the configuration data sets 108 corresponding to the selected content destinations 114 at 306. The computing device 102 is configured at 308 based on the content capture settings within the identified configuration data sets 108. For example, images being sent to a web application would be resized to 72 or 96 dots per inch (dpi) and compressed. In contrast, images being sent to a networked printer would be adjusted for 300 dpi resolution and formatted to a 4×6 size.

In some embodiments, prior to configuring the computing device 102 at 308, one or more of the content capture settings within the identified configuration data sets 108 are provided to the user 110 for editing. The user 110 interacts with the computing device 102 to override or manually change one or more of the displayed content capture settings.

The computing device 102 proceeds to capture the content 112 at 310 in accordance with the content capture settings. The content 112 is automatically transmitted to each of the selected content destinations 114 at 312 after the content 112 is captured at 310. For example, without any additional user input, the computing device 102 sends the captured content 112 to the selected content destinations 114. In such an example, after selecting the destinations 114, a single button click, depression, or selection by the user 110 causes the capture, formatting, and delivery of the content 114.

In some embodiments, the user 110 receives a notification or other feedback, an electronic mail message for example, that the captured content 112 was successfully transmitted to each of the content destinations 114. The content destinations 114 may also communicate with the computing device 102 to, for example, inform the computing device 102 of an upload status of the captured content 112. If multiple items of captured content 112 have been received by the content destinations 114, the content destinations 114 may provide an aggregated view of the transmissions and/or activities. In some embodiments, the user 110 recalls the transmitted content 112 from the content destinations 114. For example, the user 110 may replace the transmitted content 112, or have second thoughts about disseminating the content 114. The communications from the destinations 114 to the computing device 102 may occur asynchronously, in real-time, and/or at scheduled times.

In some embodiments, the content capture settings in at least one of the identified configuration data sets 108 differ from another of the identified configuration data sets 108. In such embodiments, aspects of the disclosure select one of the identified configuration data sets 108, and apply the content capture settings within the selected configuration data set 108. The content 112 captured in accordance with the applied content capture settings is transmitted to the content destination 114 corresponding to the selected configuration data set 108. Subsequently or in parallel, the captured content 112 is processed, reformatted, converted, adjusted, configured, or otherwise modified in accordance with the remaining identified configuration data sets 108 (e.g., those other than the selected configuration data set 108) to produce processed content for each of the other selected content destinations 114. The processed content is respectively transmitted to each of the remaining selected content destinations 114.

In embodiments in which the content capture settings differ among the identified configuration data sets 108, aspects of the disclosure select which content capture settings to apply by, for example, evaluating conflict resolution rules. Exemplary conflict resolution rules include user-defined, device-specific, and/or destination-specific rules for determining which content capture settings to apply. For example, some content destinations 114 may take priority over other content destinations 114, and thus the content capture settings of the highest priority content destination 114 are applied. In another example, some content capture settings may take priority over other content capture settings, and the higher priority content capture settings are applied.

In other embodiments, the least-limiting or least-restrictive content capture settings are applied. For example, if one of the content capture settings indicates that a lossy joint photographic experts group (JPEG) image is to be captured while another of the content capture settings indicates that a lossless bitmap is to be captured, embodiments of the disclosure configure the computing device 102 to capture the content 112 in the loss-less bitmap format. After the content 112 has been captured, the content 112 is converted to the JPEG format and sent to the content destination 114 associated with the content capture setting value that indicated that a JPEG image was to be captured.

Metadata may be added to the captured content 112 prior to transmission of the captured content 112 to the selected content destinations 114. For example, a geotag, geolocator, or other indicator of the physical location of the computing device 102 at the time of content 112 capture may be added to the captured content 112. In another example, a time stamp showing the time of capture, a title, or a brief description of the captured content 112 may be added. Alternatively or in addition, a hyperlink may be added to the captured content 112 linking the captured content 112 to an image gallery, blog of the user 110, or sponsored content such as an advertisement. In general, the metadata may be part of a set of predefined tags provided by, for example, a manufacturer of the computing device 102, or the metadata may include one or more user-defined tags.

Additionally, metadata may be added to the captured content 112 based on predefined actions chosen. For example if the captured content 114 is sent to a blog and to an email, metadata identifying these content destinations 114 is attached to the original copy content 112 stored on the computing device 102 (or a gallery or other storage area associated therewith). As a result, the versions of the content 114 are linked to each other through the metadata, and each item of the content 114 includes the metadata of the uses, destinations, formats, etc. that have been applied to the content 114. In such embodiments, the metadata acts as a history for the content 114.

The available content destinations 114 may be provided by the cloud service 202, or other source. In some embodiments, the user 110 may also create or identify user destinations. The user destinations may include, for example, particular web sites, galleries, or storage areas not identified in the list of content destinations 114. The user destinations may also include devices or electronic mail accounts associated with particular users such as friends or family members to whom the user 110 wishes to send the content 112. The devices include, for example, the mobile telephones of the users, or fixed-location devices such as gaming consoles, media centers, or displays in an automobile. In general, aspects of the disclosure are operable with any destination 114 that has an address and connectivity.

In such embodiments, the user 110 specifies the content capture settings for each of the created user destinations. Aspects of the disclosure associate the specified content capture settings with the created user destination. The created user destination is stored in the memory area 106, for example, or otherwise made accessible to the computing device 102 along with the other available content destinations 114.

The exemplary operations illustrated in FIG. 3 may be performed by one or more processors executing within the computing device 102, or performed by a processor external to the computing device 102 (e.g., in the cloud service 202 embodiment of FIG. 2).

Figure 4:
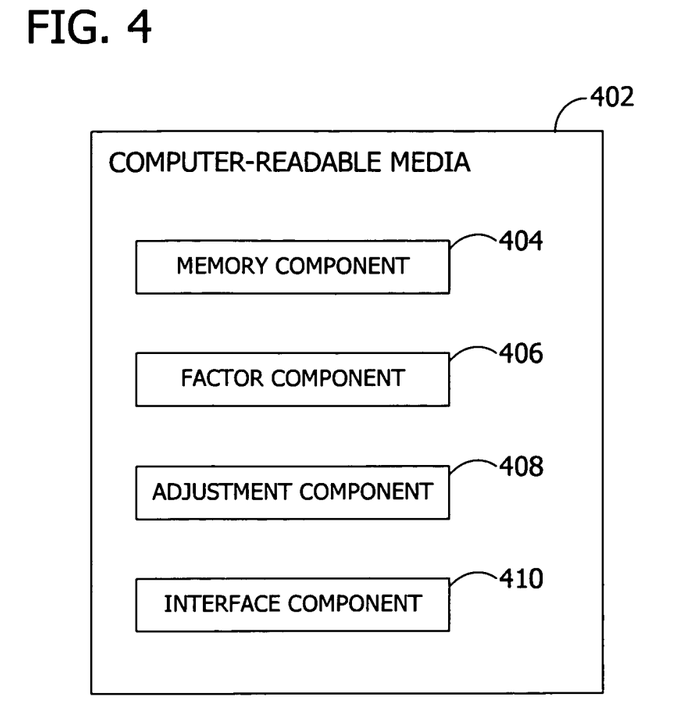
FIG. 4 is an exemplary block diagram illustrating a computer-readable medium storing computer-executable components for the automatic selection of content destinations.

Referring next to FIG. 4, an exemplary block diagram illustrates a computer-readable medium 402 storing computer-executable components for the automatic selection of content destinations 114. In the example of FIG. 4, user 110 involvement with the destination selection at the time or point of content 112 capture is minimized. A memory component 404 stores the configuration data sets 108. A factor component 406 evaluates selection criteria to identify one or more of the plurality of content destinations 114. In some embodiments, the factor component 406 executes just prior to capture of the content 112 by the computing device 102 and without input from the user 110 at the approximate time of content 112 capture. The selection criteria generally reflect the desired or target destinations of the user 110. For example, the user 110 may specify via the selection criteria that the content 112 to be captured be sent to the content destinations 114 that previously received captured content 112. In some embodiments, the factor component 406 evaluates the selection criteria to automatically identify the content destinations 114 based on one or more of the following: a location of the computing device 102, a location of the user 110, a previously-identified destination selection, a time of day, a day of year, a web browsing history, orientation of the computing device 102 (e.g., the user 110 holding the computing device 102 in portrait or landscape mode), open applications, or the application capturing the content 112. The selection criteria may also be dynamically maintained by the factor component 406. For example, aspects of the disclosure may monitor or track the content destinations 114 previously selected by the user 110, and adjust the selection criteria such that the selection criteria reflects the monitored preferences of the user 110.

In some embodiments, the factor component 406 accesses a calendar of the user 110, an address book of the user 110, and/or a global positioning system (GPS) to identify the content destinations 114. The calendar and address book may be stored on the computing device 102, or in the cloud service 202. In an example, the calendar of the user 110 may indicate that the current day is a workday, so that the computing device 102 is configured to send the captured content 112 to work-related content destinations 114. In another example, the calendar of the user 110 may indicate that a soccer game is currently scheduled at the time of content 112 capture, so that the computing device 102 is configured to send the captured content 112 to members of the soccer team. The members of the soccer team may be identified by accessing the address book. As another example, the calendar of the user 110 may indicate that the user 110 is on vacation, so that the computing device 102 is configured to send the captured content 112 to a vacation blog and image gallery. In another embodiment, the GPS system is accessed to determine a location of the user 110. If the user 110 is determined to be at work, then the computing device 102 is configured to send the captured content 112 to the work-related destinations (e.g., people). If the user 110 is determined to be at home, then the computing device 102 is configured to send the captured content 112 to friends and/or family.

An adjustment component 408 identifies the configuration data sets 108 corresponding to the content destinations 114 identified by the factor component 406 and applies to the computing device 102 one or more of the content capture setting values from the identified configuration data sets 108. In some embodiments, the adjustment component 408 executes prior to capture of the content 112 by the computing device 102. The computing device 102 captures content 112 in accordance with the applied content capture settings. An interface component 410 transmits the captured content 112 from the computing device 102 to each of the selected content destinations 114.

In the example of FIG. 4, the content destinations 114 are automatically selected around the time of content 112 capture. In some embodiments, the automatically selected content destinations 114 are provided to the user 110 for verification, confirmation, or editing just before or just after content 112 capture. The user 110 may approve of the automatically selected content destinations 114, or may adjust the content destinations 114 (e.g., manually remove one or more of the content destinations 114, or manually add one or more of the content destinations 114).

Figure 5:
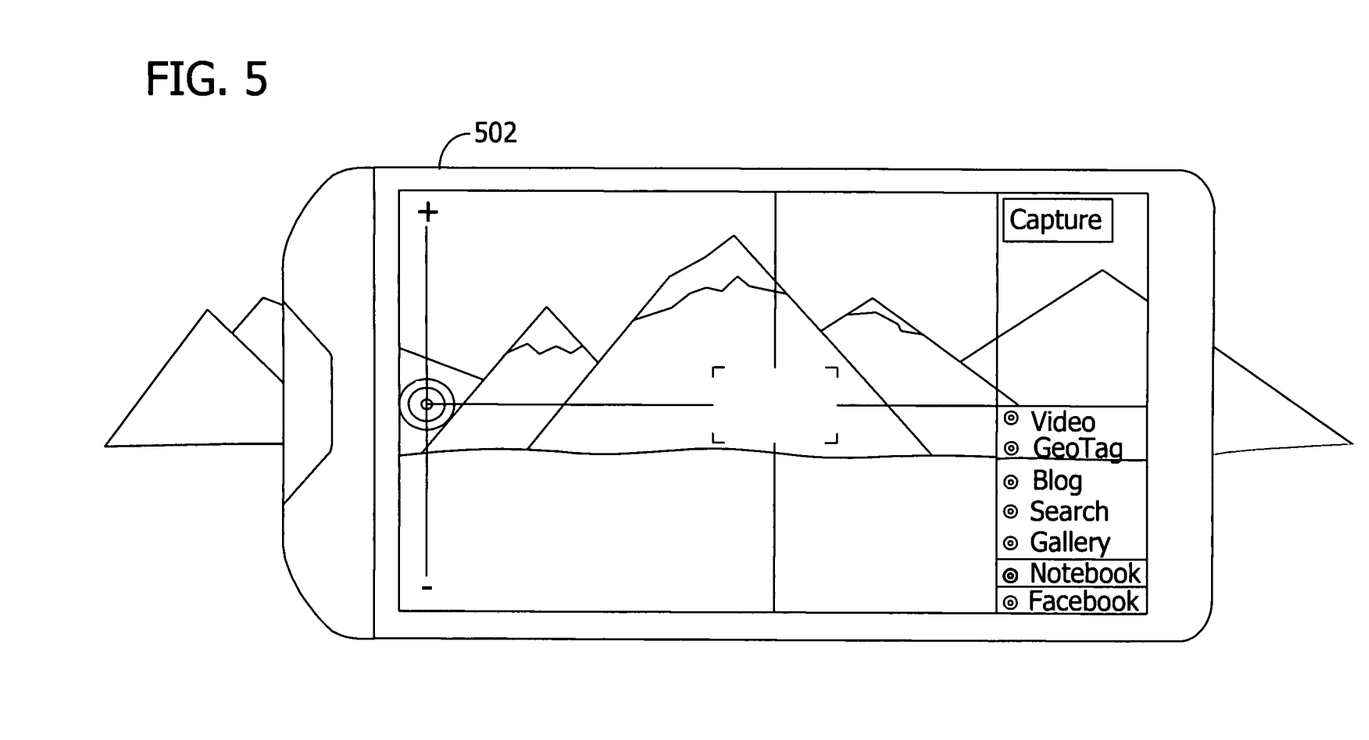
FIG. 5 is an exemplary block diagram illustrating a mobile computing device capturing content.

Referring next to FIG. 5, an exemplary block diagram illustrates the mobile computing device 502 capturing content 112. In the example of FIG. 5, the mobile computing device 502 has a screen showing an image to be captured. The mobile computing device 502 also displays a list of candidate content destinations 114 (e.g., those proposed by the factor component 406, or all available content destinations 114). The user 110 interacts with the mobile computing device 502 by, for example, touching the screen to select the desired content destinations 114 prior to capturing the content 112.

Figure 6:
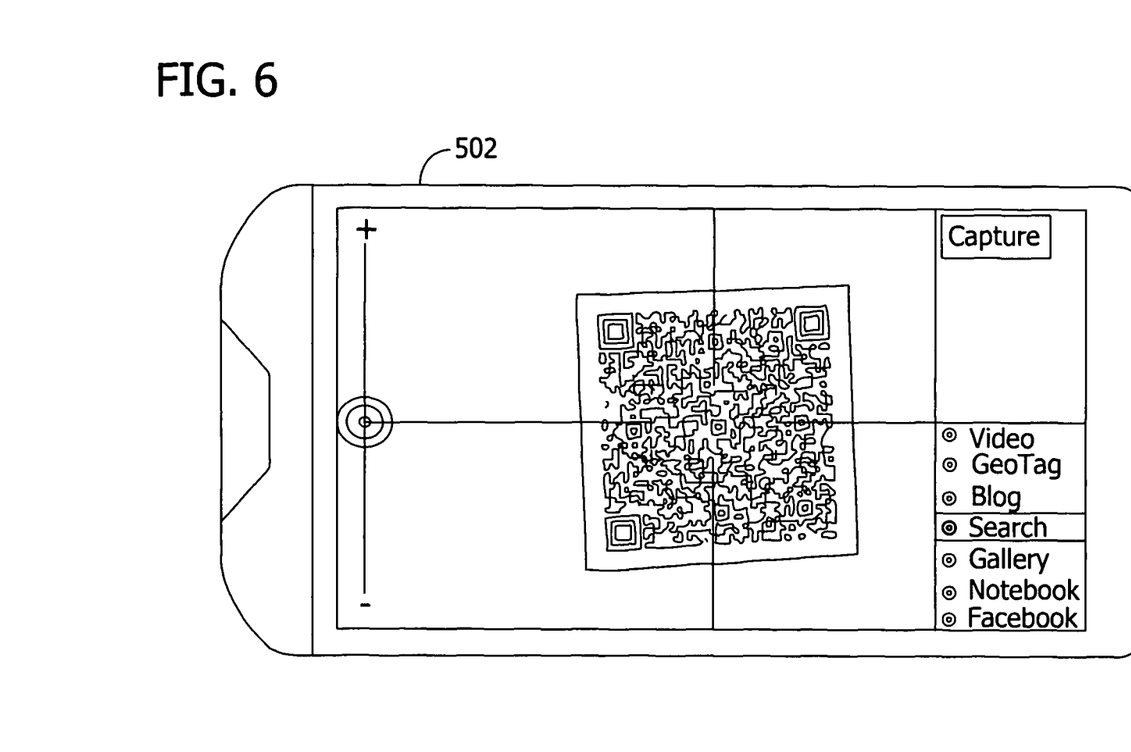
FIG. 6 is an exemplary block diagram illustrating the mobile computing device capturing an image of a bar code.

Referring next to FIG. 6, an exemplary block diagram illustrates the mobile computing device 502 capturing an image of a bar code. The bar code may be associated with, for example, a product contemplated for purchase by the user 110. In such an example, the user 110 selects "search" as one of the content destinations 114. The computing device 102 is then configured to capture the content 112 at a particular resolution, contrast level, size, and the like. Upon capturing the image of the bar code, aspects of the disclosure transmit the captured image to a search engine. The search engine returns, for example, a listing of prices for the product and hyperlinks to purchase the product. In other embodiments, however, the bar code may be associated with any item or service.

Alternatively or in addition, the user 110 captures the image of the bar code, and aspects of the disclosure perform image processing to identify the captured content 112 as containing the bar code. Embodiments of the invention then identify "search" as one of the content destinations 114, and transmit the bar code to a search engine.

Further, with known computation vision systems, additional analysis may be performed on the content 112 to form multiple queries across images (e.g., for delivery to multiple search engines) and aggregate the results in a search results page. Such additional analysis may include color histograms, shape analysis, and face recognition, for example.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for receiving the selection of the plurality of content destinations 114 from the user 110, and exemplary means for automatic formatting and delivery of the captured content 112 to the selected content destinations 114.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for configuring the delivery and capture of content prior to capture of the content by a mobile computing device, said system comprising:
　a memory area for storing a plurality of configuration data sets each associated with one or more of a plurality of content destinations, said memory area being associated with the mobile computing device; and
　a processor programmed to:
　　prior to capturing content with the mobile computing device, automatically identify, based on selection criteria, a set of content destinations to which to send the captured content;
　　provide, for display on the mobile computing device, the identified set of content destinations;
　　receive, from a user of the mobile computing device, a selection of a plurality of content destinations from the provided set of content destinations, at least two of the selected plurality of content destinations having different formats;
　　access, from the memory area, the configuration data sets corresponding to the selected content destinations;
　　adjust, prior to capturing content with the mobile computing device, content capture settings on the mobile computing device based on the accessed configuration data sets that correspond to the selected content destinations;
　　capture the content in accordance with the adjusted content capture settings; and
　　transmit the captured content from the mobile computing device to each of the selected content destinations.

2. The system of claim 1, wherein the processor is programmed to capture one or more of the following as the content: audio data, video data, and still image data.

3. The system of claim 1, wherein the processor is further programmed to process the captured content in accordance with each of the accessed configuration data sets to produce processed content for each of the selected content destinations, and wherein the processor is programmed to transmit the processed content to the respective content destinations.

4. The system of claim 1, further comprising means for receiving the selection of the plurality of content destinations from the user.

5. The system of claim 1, further comprising means for automatic formatting and delivery of the captured content to the selected content destinations.

6. A method comprising:
　storing a plurality of configuration data sets each associated with one or more of a plurality of content destinations, each of said plurality of configuration data sets comprising one or more content capture setting values;
　prior to capture of content by a computing device, selecting, based on selection criteria, a plurality of the content destinations to which to send the captured content, at least two of the selected plurality of the content destinations having different formats;
　identifying the stored configuration data sets corresponding to the selected content destinations;
　prior to capture of content by the computing device, applying to the computing device one or more of the content capture setting values from the identified configuration data sets that correspond to the selected content destinations, wherein the computing device captures content in accordance with the applied content capture setting values; and
　transmitting the captured content from the computing device to each of the selected content destinations.

7. The method of claim 6, further comprising:
　processing the captured content in accordance with each of the identified configuration data sets to produce processed content for each of the selected content destinations; and
　transmitting the processed content to the respective content destinations.

8. The method of claim 6, further comprising:
　selecting one of the identified configuration data sets;
　applying to the computing device the content capture setting values from the selected one of the identified configuration data sets, wherein the computing device captures content in accordance with the applied content capture setting values;
　processing the captured content in accordance with each of the configuration data sets other than the selected configuration data set to produce processed content;
　transmitting the captured content to the content destination associated with the selected configuration data set; and
　transmitting the processed content to each of the content destinations respectively associated with the configuration data sets other than the selected configuration data set.

9. The method of claim 6, further comprising providing, for display on the computing device, a list of one or more of the plurality of content destinations.

10. The method of claim 6, further comprising adding a geotag to the captured content.

11. The method of claim 6, wherein selecting the plurality of the content destinations comprises receiving a bar code from a user, and wherein identifying the stored configuration data sets comprises identifying the stored configuration data sets based on the bar code.

12. The method of claim 6, wherein selecting the plurality of the content destinations comprises receiving a selection via one or more of the following user actions:
　touching a screen of the computing device, tilting the computing device, gesturing on a screen of the computing device, and flicking the computing device.

13. The method of claim 6, further comprising, prior to applying said one or more of the content capture setting values:
　providing said one or more of the content capture setting values to a user; and
　receiving, from the user, a change to at least one of the provided content capture setting values.

14. The method of claim 6, further comprising:
　receiving identification of a user destination from a user;
　receiving at least one of the content capture setting values from the user;
　associating the received at least one of the content capture setting values with the user destination; and
　storing the user destination as one of the plurality of content destinations.

15. One or more computer storage media having computer-executable components, said components comprising:

a memory component for storing a plurality of configuration data sets each associated with one or more of a plurality of content destinations, each of said plurality of configuration data sets comprising one or more content capture setting values;

a factor component for, prior to capture of content by a computing device and without input from a user of the computing device, evaluating selection criteria to identify one or more of the plurality of content destinations to which to send the captured content, at least two of the identified one or more of the plurality of content destinations having different formats;

an adjustment component for, prior to capture of content by the computing device, identifying the stored configuration data sets corresponding to the identified content destinations and applying to the computing device one or more of the content capture setting values from the identified configuration data sets corresponding to the identified content destinations, wherein the computing device captures content in accordance with the applied content capture setting values; and an interface component for transmitting the captured content from the computing device to each of the selected content destinations.

16. The computer storage media of claim 15, wherein the factor component further maintains the selection criteria by monitoring previously-selected content destinations and adjusting the selection criteria based on the previously-selected content destinations.

17. The computer storage media of claim 15, wherein the factor component evaluates the selection criteria to automatically identify the content destinations based on one or more of the following: a previously-selected content destination, a time of day, a day of year, a web browsing history, and orientation of the computing device.

18. The computer storage media of claim 15, wherein the factor component accesses a calendar of the user to identify said one or more of the plurality of content destinations.

19. The computer storage media of claim 15, wherein the factor component accesses an address book of the user to identify said one or more of the plurality of content destinations.

20. The computer storage media of claim 15, wherein the factor component accesses a global positioning system to identify said one or more of the plurality of content destinations based on a location of the computing device as determined by the global positioning system.

* * * * *